United States Patent [19]

Su

[11] 4,024,829
[45] May 24, 1977

[54] LEAKAGE WARNING DEVICE FOR PNEUMATIC TIRE

[76] Inventor: Chiang Shui Su, No. 237, Ming-Kuo Rd., Chia-Y, China /Taiwan

[22] Filed: July 14, 1975

[21] Appl. No.: 595,884

[52] U.S. Cl. .............................. 116/34 R; 137/227; 137/557; 73/146.8
[51] Int. Cl.² ......................................... B60C 23/02
[58] Field of Search ............ 137/227, 557; 116/34, 116/34 A, 34 B, 34 R; 73/146.8

[56] References Cited

UNITED STATES PATENTS

| | | | |
|---|---|---|---|
| 1,236,411 | 8/1917 | Downs | 116/34 R |
| 1,455,146 | 5/1923 | Nelson | 116/34 R |
| 2,037,969 | 4/1936 | Duty | 116/34 R |
| 3,738,308 | 6/1973 | Barabino | 116/34 R |

*Primary Examiner*—Harold W. Weakley

[57] ABSTRACT

An air leakage warning device for a pneumatic tire is described which comprises a housing member including in longitudinal direction a cylindrical intermediate section, an enlarged cylindrical lower section connected to the cylindrical intermediate section through a shoulder portion, and a four-sided upper section having a circular at the outmost end; a cylinder or tubular member containing a perforated piston means and a coil spring responsive to a predetermined pressure within the tire, the upper end of the cylinder member being inter-connected with the lower section of the housing member while the lower end thereof is secured to a base member which is adapted to be secured to the air filling valve stem of the pneumatic tire; a rubber ball being freely movable in the space defined by the housing member and the upper end of the cylinder member; and a rubber sack forming a receiver for escaping tire air and adapted to be ruptured by its contained air pressure so as to give an audible signal, the rubber sack having an inwardly directed annular rim integrally provided on the circumference of the sack opening to be firmly anchored between the cylinder member and the base member. When the air pressure of the tire is reduced to the predetermined value, the piston means will open the air filling valve to permit the escape of the air from the tire into the device and thereby to inflate and rupture the rubber sack. Thereafter, the rubber ball is blown into a position inside the four-sided upper section of the housing member to block the circular opening of the housing member and thus prevent further escape of air.

4 Claims, 6 Drawing Figures

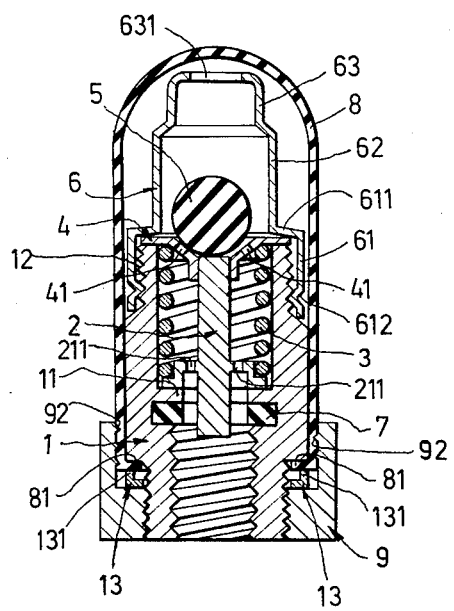
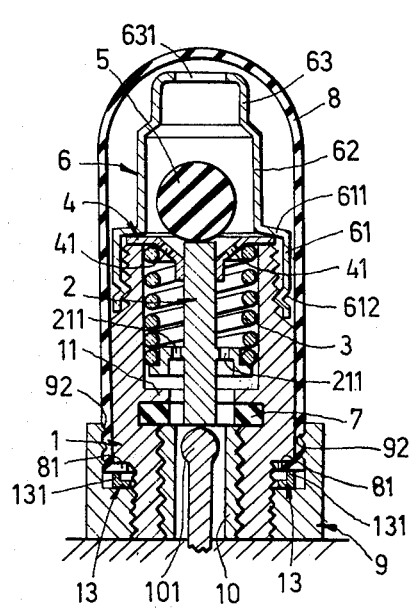
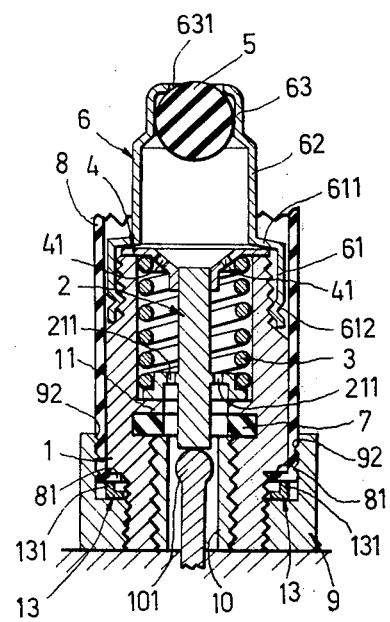
FIG. 2
FIG. 3
FIG. 4

LEAKAGE WARNING DEVICE FOR PNEUMATIC TIRE

BACKGROUND OF THE INVENTION

The present invention relates to signal devices for pneumatic tires, and especially aims to provide a novel and improved device, which is adapted to be mounted onto an ordinary valve body of the tire filling valve, for producing an audible signal when the tire becomes deflated a certain amount, thereby warning the driver, in order that the tire can be inflated, replaced or repaired, to prevent running on a flat or under-inflated tire and thus avoid the injury to tires due to too little air therein.

As well known, air leakage of tires frequently occurs in running vehicles when a tire is pierced by nails or when something is wrong with its inner tube or air filling valve means. In case the leakage of air does occur and the driver is not aware of it and drives his vehicle in such deflated condition, then even over a short distance, the tire will be greatly damaged. This condition is even more serious when a leakage occurs in one of the two tires of the rear wheels, especially heavy duty vehicles such as trucks or buses, and thus the other tires will eventually be subjected to an excessive load which may develop and explosion.

Before the condition progresses to a serious stage the leaky tire should be inflated or replaced by a spare one, hence some means available for warning the driver in advance of the dangerous condition of the tire should be provided.

As is well known in the art to which this invention relates, many devices have been proposed to warn the operator of a vehicle when a tire pressure has decreased below a predetermined amount. However, difficulties have been encountered with such devices due to the fact that they require complicated structure and high cost to manufacture.

SUMMARY OF THE INVENTION

To overcome the above and other problems and difficulties, it is therefore the principal object of the present invention to provide a device which avoids the drawbacks of the prior art.

More particularly, it is an object of the present invention to provide a novel and improved device which reduces the possibility of damage to the vehicle tire during driving.

A more specific object of the present invention is to provide a device comprising: a housing member including in longitudinal direction a cylindrical intermediate section, an enlarged cylindrical lower section connected to the cylindrical intermediate section through a shoulder portion, and a four-sided section having a circular opening at its outermost end; a cylinder or tubular member containing a perforated piston means and a coil spring, the upper end of the cylinder member being inter-connected with the housing member while the lower end thereof is secured to a base member which is adapted to be secured to the air filling valve seat of the pneumatic tire; a rubber ball being freely accommodated in the space defined by the housing member and the upper end of the cylinder member; and a rubber sack forming a receiver for escaping tire air and adapted to be ruptured by air pressure so as to given an audible signal, the rubber sack having inwardly directed annular rim integrally provided on the circumference of the sack opening to be firmly anchored between the cylinder member and the base member.

When in use the above device is securely fixed to the air filling valve stem in such a manner that the tip of the air filling valve will abut the lower end of a rod formed on the piston means. Therefore, when the air pressure of the tire is normal, the tip of the air filling valve will act on the piston means to urge the same upwardly against the coil spring. But when the air pressure of the tire drops down, due to whatever cause, to a predetermined value lower than the restoration force of the coil spring, the rod will force the tip of the valve to make a downward movement and thereby open the valve.

In this condition, the air contained in the tire will rush out and pass therefrom toward the rubber sack through perforations formed on the piston member and cylinder member and the circular opening of the housing member. Thereupon, the rubber sack will be swelled up like a balloon and as the pressure inside the balloon rises to its breaking point, the sack will burst and produce an audible sound. This sound will draw the driver's attention to the fact that one of the tires is out of order and that some remedy must be taken.

Immediately after the rubber sack is ruptured, the out-rushing air will force the rubber ball to move into the four-sided section of the housing member and finally reach the uppermost end position to block the circular opening and thus prevent further escape of air.

The device in accordance with the present invention can be used repeatedly by merely replacing the ruptured sacks with new ones.

Furthermore, the device in accordance with the present invention will be durable and efficient in use, one that will be compact in size, simple and easy to manufacture, and one which can be placed upon the market at a reasonable cost.

With these and other objects, features and advantages in view, the present invention comprises a novel construction, arrangement and formation of parts, as will be hereinafter more specifically described, claimed and illustrated in the accompanying drawings.

BRIEF DESCRIPTION OF THE DRAWINGS

FIG. 2 is an elevational view, in section, of the device of FIG. 1;

FIG. 3 is an elevational view in section, showing the device of the present invention in its normal position;

FIG. 4 is an elevational view in section, showing the rubber sack after being ruptured, the rubber ball being forced into a position inside the four-sided upper section of the housing member to block the circular opening and thus prevent further escape of air.

DETAILED DESCRIPTION OF THE PREFERRED EMBODIMENT

Figure 1:
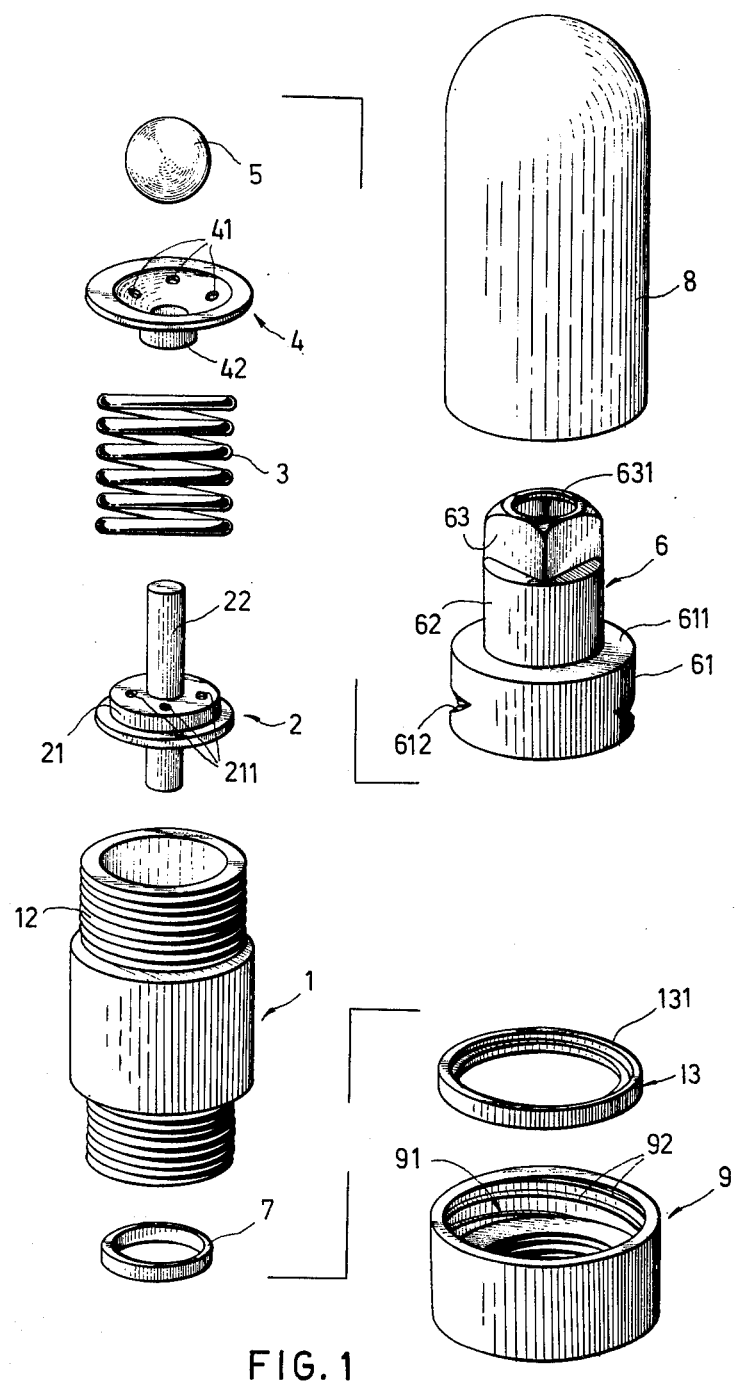
FIG. 1 is an exploded perspective view of an air leakage warning device for a pneumatic tire according to the present invention.

Referring now to the drawings for a better understanding of this invention, wherein similar reference characters designate corresponding parts throughout the several views, it will be seen that the device of the present invention generally has a configuration of a bullet shape and is composed of a housing member 6, a cylinder member 1, a base member 9, a perforated plate 4, a coil spring 3, a piston means 2, a rubber ball 5 and a rubber sack 8. As is seen from the sectional views, the housing member 6 comprises a cylindrical intermediate section 62, an enlarged cylindrical lower section 61 and a four-sided upper section 63 having a circular opening 631 at its uppermost end. The lower section 61 of said housing member 6 has a relatively larger diameter than the other section and is connected to the intermediate section 62 through a shoulder portion 611, and the inner wall thereof is formed with a screw thread or plurality of transversely dotted protuberances as shown at 612. Through the protuberances 612 and screw thread 12 formed on the upper surface of the cylinder member 1, the housing member 6 may be firmly interlocked with the cylinder member 1. In connecting the above two components, i.e. member 6 and 1, the piston member 2 should first be inserted in the cylinder member 1; then the coil spring 3, the perforated disk 4 on the upper end of the cylinder member 1 with the edge portion thereof resting thereon; and finally, the rubber ball 5 on the disk 4, such that the rubber ball 5 is freely movable in the space defined by said housing member 6 and said disk 4, as best shown in FIG. 2 and FIG. 3. Since the perforated disk 4, has an opening 42 at its center, and since the piston means 2 has an upwardly extending rod 22 of an enough length, when the above-mentioned assembly has been completed, the upper portion of the rod 22 will penetrate the opening 42, with its end extending inside the housing member 6. As can be seen from the drawings, the piston means 2 is simply seated on the inwardly extending annular portion 11 formed in the inner wall of the cylinder member 1 and the peripheral edge portion of the disk plate 4 is fixedly secured inbetween the end of the member 1 and the shoulder portion 611 of the housing member 6. Thus the piston means 2 will be urged upwardly when a force exceeding the spring force of the coil spring 3 is applied to the rod 22 of the piston 2 in the direction against the spring force.

The lower portion of the cylinder member 1 has an outer diameter smaller than the upper portion and both of the external and internal surfaces thereof are formed with screw threads. The external screw thread, which is extending in one direction, e.g. counter clockwise direction, is used for screwing into the base member 9 while the internal screw thread, which is extending in an opposite direction, e.g. clockwise direction, is adapted to screw the assembly onto the conventional air filling valve seat 10 provided on the tire; and member 7 is an O-ring inserted in an annular groove formed in the inner wall of the cylinder member 1 to provide an effective pneumatic seal around the junction of the valve seat 10 and the cylinder member 1 at the end plane of the valve seat 10, as shown in FIG. 2 and FIG. 3.

The base member 9 has an outer diameter larger than the cylinder member 20 and is provided with an annular recess 91 for receiving the lower end of the rubber sack 8.

Before interlocking the cylinder member 1 with the base member 9, the housing member 6 and the upper portion of the cylinder member 1 should previously be covered with the rubber sack 8. The rubber sack 8 is provided with an inwardly directed annular rim 81 on the circumference of the sack opening thereof. The inner wall of the base member 9, which is surrounding the recess 91, is provided with screw thread 92 to increase the friction resistance between the rubber sack 8 and the base member 9. In addition, an annular washer 13, which has an upwardly projecting circumferential flange 131, is disposed on the bottom surface of the recess 91 with its flange 131 pressing the rim 81 against the cylinder member 1; hence when the cylinder member 1 is screwed into the base member 9, the rubber sack 8 as well as the rim 81 thereof will be firmly secured or anchored between the member 1 and 9.

The use of the device of the present invention will be best understood from the following description with reference to FIG. 3 and FIG. 4.

In FIG. 3, the device is shown in its normally inactive position; that is, the device has already been installed onto the air filling valve stem 10. As shown in FIG. 3, the tip 101 of the air valve is acting on the lower end of rod 22 and urging piston means 2 upwardly against the spring 3 so as to make the said spring assume a compressed position. In this condition, the air valve 10 is in the closed position, but when the air pressure of the tire drops to a predetermined value through certain causes, such as for example, piercing by nails or the like, the tip 101 of the air valve will be pushed downwardly by the restoration force of the spring 3, and thereby open the air valve. Upon the opening of said air valve, the air contained in the tire will rush out and pass therefrom toward the housing member 6 through perforations 211 formed on the piston means 2, cylinder member 1, perforations 41 formed on the plate 4 and the gaps existing between the rubber ball 5 and the corners of the four-sided upper section 63 of the housing member 6, and finally act on the rubber sack 8 from the circular opening 631 of the housing member 6, whereby the rubber sack 8 will be swelled up like a balloon. When the air pressure within sack 8 reaches the breaking point of the sack, the sack will burst and emit an explosive sound to give a warning to the vehicle driver that one of his vehicle tires has an air leakage and that some remedy must be taken.

Immediately after the bursting of the sack, the outgoing air through the housing member 6 is drastically increased; therefore the rubber ball 5 is forced to block the circular opening 631 and thus prevent further escape of air, as shown in FIG. 4.

The present invention also contemplates some modifications of the invention without departing from the spirit thereof, as will be hereinafter more fully described.

Figure 5:
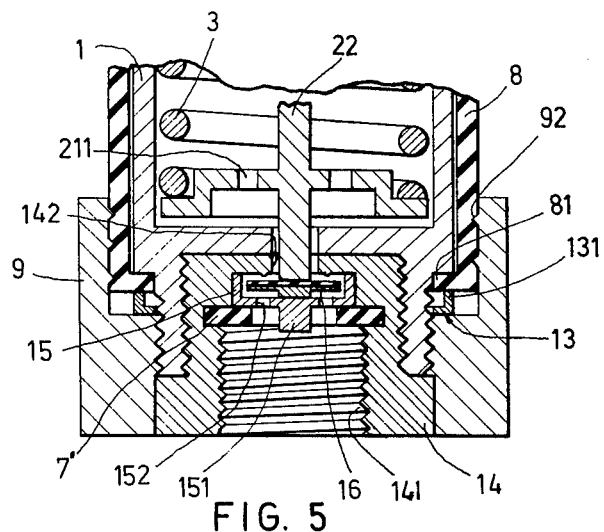
FIG. 5 is a fragmentary view, in section, of an air leakage warning device according to the present invention, showing modifications of the aforesaid structure.

Turning now to FIG. 5, which illustrates another embodiment of the present invention in fragmentary sectional view, the structure of the upper portion of the modified device is the same as that described and illustrated in the above and is now shown for simplicity. As can be seen from FIG. 5, the lower end of the cylinder member 1 has threaded therein a head 14, which is provided with a threaded bore 141 for receiving a conventional air filling valve (not shown in FIG. 5) and is provided with an axial guide opening 142 at the uppermost end, through which the piston rod 22 is adapted to extend. A cap member 15 having air escape opening 152 is arranged axially within the head 14 for accommodating a seal member 16, which is adapted to engage the inner surface of the head 14 and to cover the opening 142 so as to normally prevent the escape of air therethrough. The cap member 15 has a projecting portion 151 extending downward, the purpose of which will be hereinafter more fully apparent. The member 7' is an O-ring for making an airtight joint.

Figure 6:
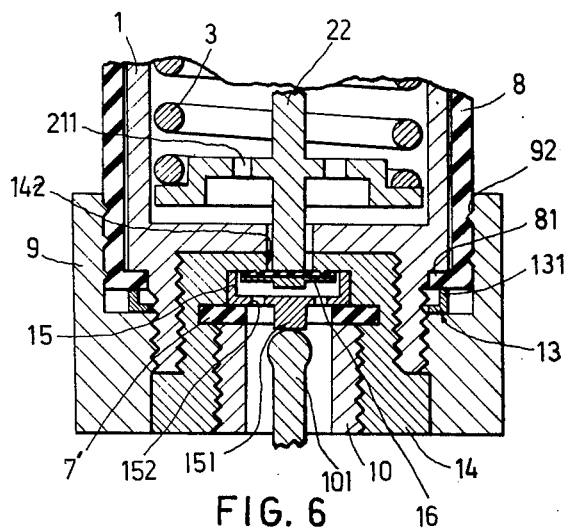
FIG. 6 is a fragmentary view, in section, illustrating the device of FIG. 5 in its normal position.

In operation of the modified device, the head 14 as well as the assembly is threaded on the conventional valve seat 10 as shown in FIG. 6, in which the upper portion of the device is now shown for simplicity. The projecting portion 151 of the cap member 15 engaging the valve tip 101 of the air filling valve will push the same downward and allow the air to escape into the cap member 15 through opening 152 and to act upon the seal member 16. The air acting upon the seal member 16 will force the same upwardly against the tension of the coil spring 3 applied through the piston rod 22, and finally urge the seal member 16 to engage the inner surface of the head 14 and thus cover the opening 142 thereof to prevent escape of air from the cap member 15.

Now, when the air in the tire goes below a predetermined pressure, the tension of the coil spring 3 will press downward on the seal member 16 away from the inner surface of the head 14, and permit the escape of air into the cylinder member 1 through the opening 152 of the cap 15 and the opening 142 of the head 14; then as a subsequent operation of the modified device, the rubber sack 8 is ruptured to omit an audible signal and the rubber ball is forced to block the opening 631 of the housing member 6 to prevent further escape of air in a manner as aforementioned.

Accordingly, by using the device of the present invention the driver is made to realize the condition of his tires and take proper measures before developing a fatal damage to a defective tire or to the safety of the vehicle.

While specific embodiments of the invention have been described herein, it is to be understood that other modifications, substitution and equivalents may be used without departing from the spirit and scope of the inventive concept.

What I claim is:

1. An air leakage warning device for a pneumatic tire comprising: a housing member having a circular opening at the top end thereof; a cylinder member containing a perforated piston means and a coil spring responsive to a predetermined pressure within the tire, the upper end of the cylinder member being inter-connected with the lower section of the housing member, while the lower end thereof is provided with internal threads and adapted to be screwed onto a conventional air filling valve stem of a tire; a rubber sack enveloping the housing member and the cylinder member and forming a receiver for escaping tire air and adapted to be ruptured by air pressure so as to emit an audible signal; a base member adapted to be affixed to the lower end of the cylinder member with the lower end of the rubber sack sandwiched therebetween thereby tightly secure the rubber sack against the cylinder member; and further comprising a rubber ball freely movable in the space defined by the housing member and the upper end of the cylinder member in order to block the circular opening of the housing member and thus prevent further escape of air immediately after the rubber sack is ruptured by the pressure of the escaping tire air.

2. An air leadage warning device for a pneumatic tire comprisng: a housing member including in longitudinal direction a cylindrical intermediate section, an enlarged cylindrical lower section connected to the cylindrical intermediate section through a shoulder portion, and a four-sided upper section having a circular opening at its top end; a cylinder member containing a perforated piston means and a coil spring responsive to a predetermined pressure within the tire and a perforated diskplate covering the upper end thereof, the upper end of the cylinder member being inter-connected with the lower section of the housing member while the lower end thereof is provided with internal threads adapted to be screwed onto a conventional air filling valve stem of the tire; a rubber sack enveloping the housing member and the cylinder member and forming a receiver for escaping tire air and adapted to be ruptured by air pressure so as to emit an audible signal, the rubber sack having an inwardly directed annular rim integrally formed on the circumference of the sack opening; a base member adapted to be screwed onto the lower end of the cylinder member with the rim and the lower end of the rubber sack sandwiched therebetween thereby tightly secure the rubber sack against the cylinder member; and further comprising a rubber ball freely movable inside the cylindrical intermediate section in order to block the opening of the housing member and thus prevent further escape of air immediately after the rubber sack is ruptured by the pressure of the escaping tire air.

3. A device as defined in claim 1, wherein the base member is provided with an annular recess for receiving the lower end of the rubber sack and the wall of the recess is provided with internal screw thread; further comprising in the recess an annular washer having upwrdly projecting circumferential flange.

4. An air leakage warning device for a pneumatic tire comprising: a housing member including in longitudinal direction a cylindrical intermediate section, an enlarged cylindrical lower section connected to the intermediate section through a shoulder portion, and a four-sided upper section having a circular opening at its top end; a cylinder member containing a perforated piston means and a coil spring responsive to a predetermined pressure within the tire and a perforated disk plate covering the upper end thereof, the upper end of the cylinder member being interconnected with the lower section of the housing member while the lower end thereof is provided with internal threads for connection; a head having a threaded bore for receiving a conventional air filling valve of the tire and an axial guide opening at the uppermost end thereof, the head being adapted to be screwed into the lower end of the cylinder member; a cap member having an air escape opening and a downward projection and being disposed axially within the head; a seal member in the cap member for engaging the inner surface of the head so as to normally cover the opening at the uppermost end of the head; a rubber sack enveloping the housing member and the cylinder member and forming a receiver for escaping tire air and adapted to be ruptured by air pressure so as to emit an audible signal, the rubber sack having an inwardly directed annular rim integrally formed on the circumference of the sack opening; a base member adapted to be screwed onto the lower end of the cylinder member with the rim and the lower end of the rubber sack sandwiched therebetween thereby tightly secure the rubber sack against the cylinder member; and further comprising a rubber ball freely movable inside the cylindrical intermediate section in order to block the opening of the housing member and thus prevent further escape of air immediately after the rubber sack is ruptured by the pressure of the escaping tire air.

* * * * *